United States Patent [19]
Danish et al.

[11] Patent Number: 5,770,907
[45] Date of Patent: Jun. 23, 1998

[54] WINDSHIELD WIPER MOTOR FOR USE IN A VEHICLE AND METHOD FOR MANUFACTURING

[75] Inventors: Peter John Danish, Scottsville; Frank Richard Lombardo, Rochester, both of N.Y.; Christopher Howard Jones, Dayton, Ohio

[73] Assignee: ITT Automotive Electrical Systems, Inc., Auburn Hills, Mich.

[21] Appl. No.: 514,537

[22] Filed: Aug. 14, 1995

[51] Int. Cl.$^6$ ............................. H02K 5/00; H02K 5/02; H02K 5/08; H02K 5/16
[52] U.S. Cl. .................. 310/90; 310/43; 310/89
[58] Field of Search ............... 310/43, 90, 89; 384/438, 428

[56] References Cited

U.S. PATENT DOCUMENTS

| | | | |
|---|---|---|---|
| 2,698,910 | 1/1955 | Blyth | 310/51 |
| 2,827,582 | 3/1958 | Krebs | 310/168 |
| 4,013,829 | 3/1977 | Baar et al. | 358/299 |
| 4,019,434 | 4/1977 | Hoexter | 101/216 |
| 4,320,329 | 3/1982 | Gille et al. | 318/443 |
| 4,362,104 | 12/1982 | Imai et al. | 101/349 |
| 4,413,560 | 11/1983 | Rogge | 101/247 |
| 4,473,920 | 10/1984 | Itani | 15/250.22 |
| 4,499,826 | 2/1985 | Regge | 101/181 |
| 4,527,105 | 7/1985 | Shiraishi | 318/444 |
| 4,544,870 | 10/1985 | Kearns et al. | 318/444 |
| 4,602,562 | 7/1986 | Ottenhues et al. | 101/182 |
| 4,614,886 | 9/1986 | Schneider et al. | 310/83 |
| 4,625,157 | 11/1986 | Phillimore | 318/443 |
| 4,634,944 | 1/1987 | Hastings et al. | 318/443 |
| 4,663,575 | 5/1987 | Juzswik et al. | 318/444 |
| 4,672,253 | 6/1987 | Tajima et al. | 310/269 |
| 4,689,535 | 8/1987 | Tsunoda et al. | 318/443 |
| 4,692,645 | 9/1987 | Gotou | 310/184 |
| 4,761,576 | 8/1988 | Savage | 310/51 |
| 4,774,424 | 9/1988 | Habermann | 310/90.5 |
| 4,862,582 | 9/1989 | Henck | 310/89 |
| 4,864,927 | 9/1989 | Niehaus | 101/181 |
| 4,874,975 | 10/1989 | Hertrich | 310/186 |
| 4,890,024 | 12/1989 | Hashimoto et al. | 310/49 R |
| 4,933,584 | 6/1990 | Harms et al. | 310/162 |
| 4,947,066 | 8/1990 | Ghibu et al. | 310/49 R |
| 4,947,092 | 8/1990 | Nabha et al. | 318/444 |
| 5,030,899 | 7/1991 | Nishibe et al. | 318/444 |
| 5,038,460 | 8/1991 | Ide et al. | 29/596 |
| 5,086,245 | 2/1992 | Sieja et al. | 310/216 |
| 5,173,651 | 12/1992 | Buckley et al. | 318/701 |
| 5,184,927 | 2/1993 | Judy | 409/143 |
| 5,218,256 | 6/1993 | Umezawa et al. | 310/90 |
| 5,239,924 | 8/1993 | Wallmann et al. | 101/179 |
| 5,268,607 | 12/1993 | McManus | 310/89 |
| 5,294,356 | 3/1994 | Tanaka et al. | 508/462 |
| 5,296,538 | 3/1994 | Orikasa et al. | 525/63 |
| 5,306,992 | 4/1994 | Dröge | 318/483 |
| 5,331,257 | 7/1994 | Materne et al. | 318/85 |
| 5,343,104 | 8/1994 | Takahashi et al. | 310/90 |

FOREIGN PATENT DOCUMENTS

| | | |
|---|---|---|
| 0454438 | 10/1991 | European Pat. Off. . |
| 58009565 | 1/1983 | Japan . |

*Primary Examiner*—Clayton E. LaBalle
*Attorney, Agent, or Firm*—Jacox, Meckstroth & Jenkins

[57] ABSTRACT

A system and method for manufacturing and/or molding a plurality of parts, such as a sleeve bearing and a roller bearing, into a predetermined position in the housing wiper motor comprising a component such as a housing. The wiper motor comprises a motor housing, a plurality of bearings integrally insert molded into a predetermined position in the motor housing and a motor situated in the motor housing and having a plurality of shafts which are received in the plurality of bearings. The method for molding a motor housing for use in the vehicle comprises the steps of situating at least one part, such as the sleeve bearing, into a mold for molding the motor housing and then insert molding the housing such that the at least one part becomes integrally formed or molded into a predetermined position therein. In a preferred embodiment, the part is molded into the housing such that it is aligned within a tolerance range of about −0.05 mm to +30 0.05 mm. The housing is then assembled with a motor, and the assembled housing and motor may then be used in a vehicle.

25 Claims, 8 Drawing Sheets

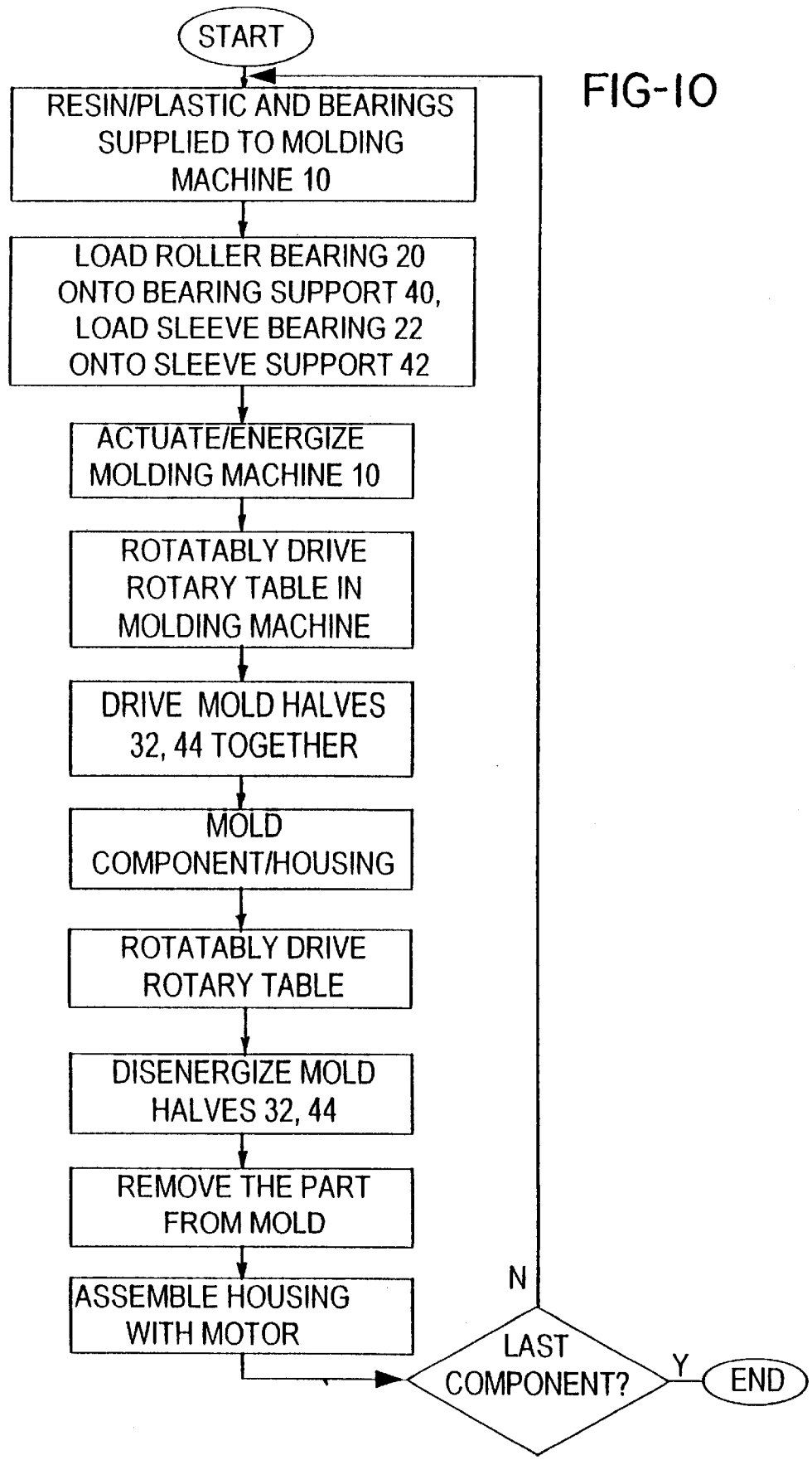

WINDSHIELD WIPER MOTOR FOR USE IN A VEHICLE AND METHOD FOR MANUFACTURING

BACKGROUND OF THE INVENTION

1. Field of the Invention

This invention relates to windshield wiper motors, and more particularly, it relates to a method and apparatus for molding a plurality of parts into a windshield wiper housing.

2. Description of Related Art

In vehicles of the past, a die cast metal housing was typically used for housing a windshield wiper motor which was operatively coupled to a windshield wiper drive and apparatus for wiping a windshield of a vehicle, such as a car. Some of the problems of the metal housings included their expense and the weight of the housing itself.

Another problem with housings of the past is that there were various steps involved in preparing a housing so that it was capable of receiving parts, such as roller bearings and sleeve bearings. For example, after a part was die cast to provide a metal housing, the housing would have to be deflashed, machined and then cleaned. The bearings then had to be press fit or mounted into the machined metal housing. If the deflashing, machining or assembly caused the bearings to be misaligned in the housing, then the entire metal housing and bearings were usually scrapped or they had to be remachined. This also caused the manufacturer to incur a greater expense than desired.

There is, therefore, a need for a housing which provides savings in raw materials, facilitates reducing the overall weight of the housing and wiper motor, and reduces the number of steps in providing a completed housing, yet at the same time enhances reliability and improves the dimensional consistency of the bearings or parts that are mounted to the housing.

SUMMARY OF THE INVENTION

Accordingly, it is a primary object of this invention to provide a method and apparatus which facilitates manufacturing a lightweight, low cost housing and which provides means for integrally forming or molding one or more parts into a predetermined position into the housing, thereby reducing or eliminating the need to machine a housing such that it can receive, for example, a bearing.

In one aspect, this invention comprises a method for molding a component for use in a vehicle, comprising the steps of inserting a plurality of parts into a predetermined position in a component mold; and insert molding the component such that said plurality of parts become integrally formed therein.

In another aspect, this invention comprises a method for manufacturing a motor housing for use in an automobile, comprising the steps of situating at least one part into a mold for molding said motor housing; and insert molding said housing such that said at least one part becomes integrally formed therein.

In still another aspect of the invention, this invention comprises a motor housing comprising, a housing member, and a plurality of parts integrally molded into a predetermined position in said housing member.

In yet another aspect of the invention, this invention comprises a wiper motor for use in a vehicle comprising a motor housing, a plurality of bearings integrally molded into a predetermined position in said housing member, and a motor situated in the motor housing and having a plurality of shafts received in the plurality of bearings.

Another object of this invention is to provide an insert molding process for integrally molding a plurality of bearings into a predetermined position and within a tolerance range of about −0.05 mm to +0.05 mm which utilizes less steps than processes of the past.

These objects, and others, may be more readily understood in connection with the following specification, claims and drawings.

BRIEF DESCRIPTION OF THE DRAWINGS

FIG. 10 is a schematic view illustrating a method of molding in accordance with an embodiment of this invention.

DETAILED DESCRIPTION OF THE INVENTION

Figure 1:
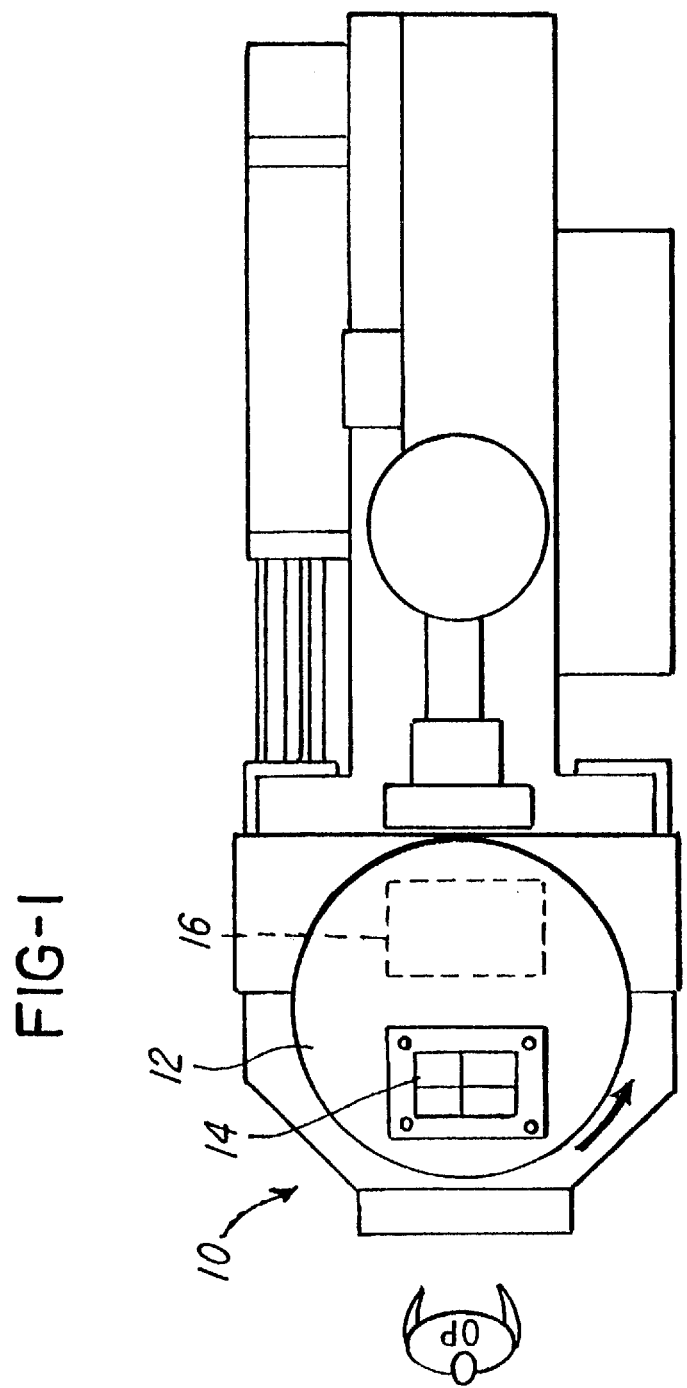
FIG. 1 is a top view of a molding system according to one embodiment of the invention.

Referring now to FIG. 1, a molding system and method will now be described. The molding system comprises a molder or molding machine 10 of the type manufactured by Engel Canada of Guelph Ontario. The molder 10 comprises a rotary table 12 having a plurality of molds 14 and 16 for molding a part in the manner described below. In the embodiment being described, the molder 10 is an insert injection molder. It should be appreciated that while the molds 14 and 16 may be substantially identical so that as one part is being molded (e.g., in mold 16) an operator or machine can be unloading a previously molded part from mold 14.

Figure 2A:
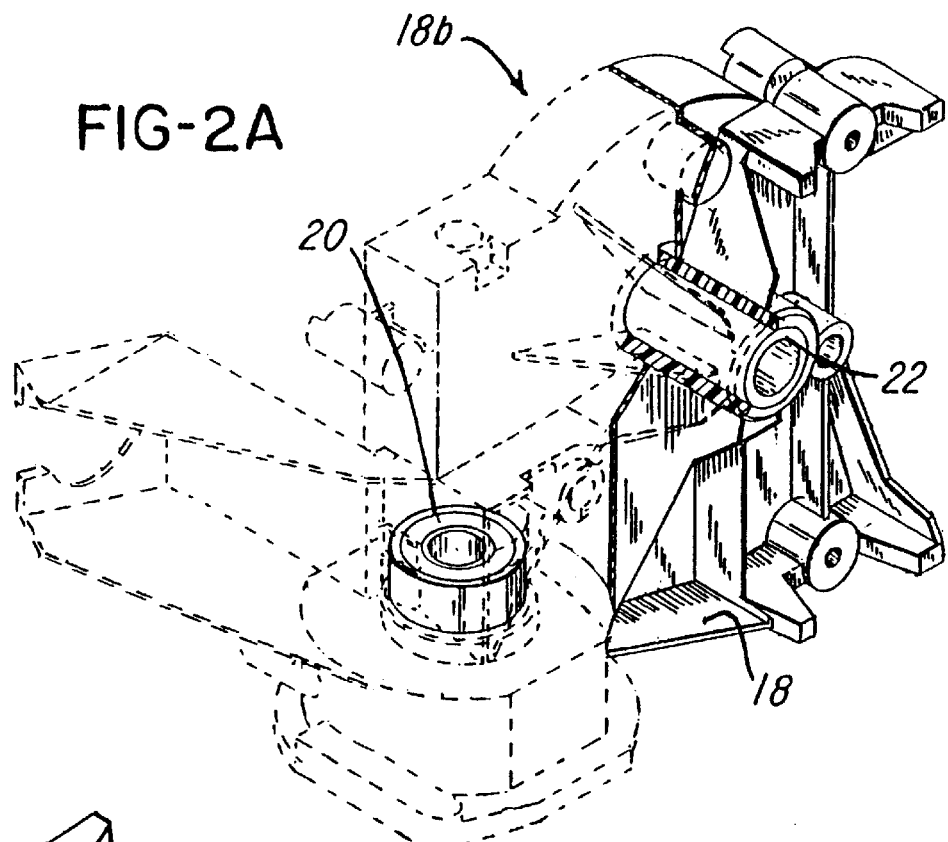
FIG. 2A is an isometric view, partially in phantom, of a wiper motor housing molded with the molding system.
Figure 2B:
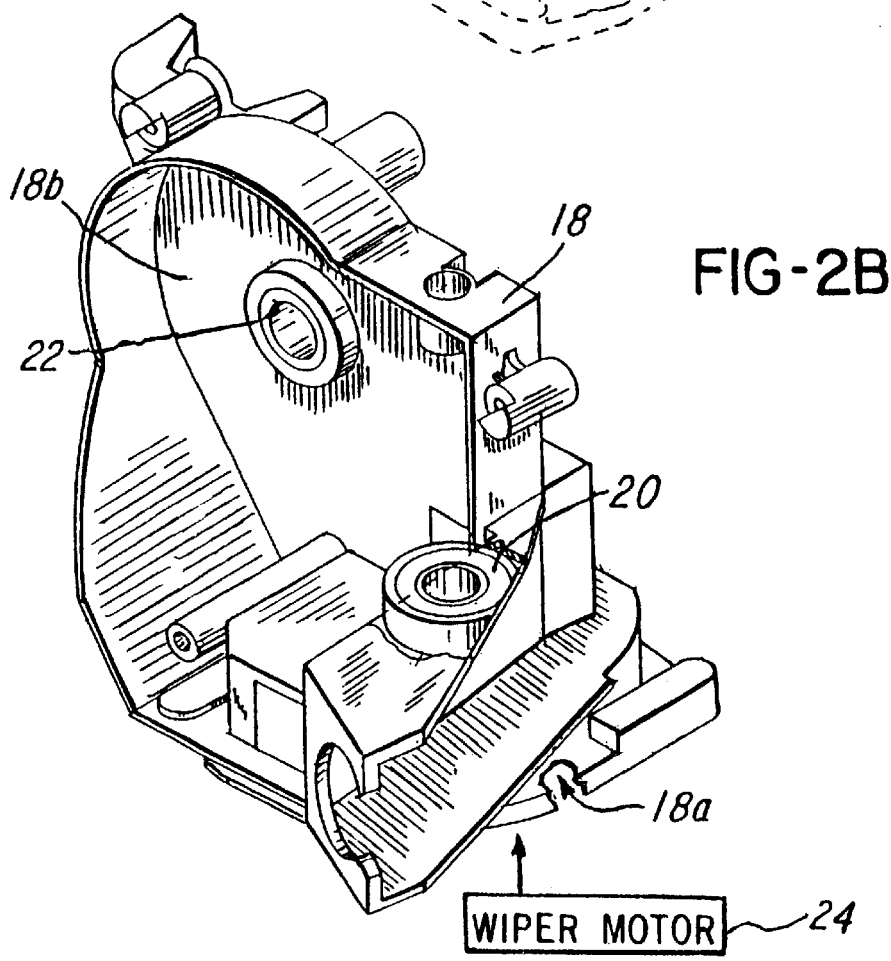
FIG. 2B is a fragmentary isometric view of the motor housing and also showing a motor.

FIGS. 2A and 2B illustrate a part 12 manufactured in accordance with an embodiment of the invention. The part 12 comprises a motor housing 18 and a plurality of parts or components, such as a ball or roller bearing 20 and a sleeve bearing 22. Notice that in the embodiment being described, the bearings are integrally molded to become an integral part of the motor housing 18. It should also be appreciated that the bearings 20 and 22 become integrally molded into a predetermined position such that a motor 21, for example, having one or more drives and/or output shafts can be operatively aligned and positioned in the roller bearing 20 and sleeve bearing 22 when the motor is mounted in the motor housing 18.

In this regard, the bearings 20 and 22 each have an axis, as illustrated by imaginary lines A (FIG. 4) and B (FIG. 3), respectively. After the bearings 20 and 22 are integrally molded or formed into the motor housing 18, their axis' are not co-axial. Thus, the axis of the roller bearing 20, for example, lies in a first plane and the axis of sleeve bearing 22 lies in a second plane, and the first and second planes are substantially perpendicular. After the motor housing 18 is integrally molded with roller bearing 20 and sleeve bearing 22, it is capable of receiving a motor, such as a wiper motor 24 (FIG. 2B) and appropriate gears (not shown) in housing areas 18a and 18b, respectively. The assembled motor 24 and housing 18 may then be mounted and used in a vehicle (not shown).

Figure 3:
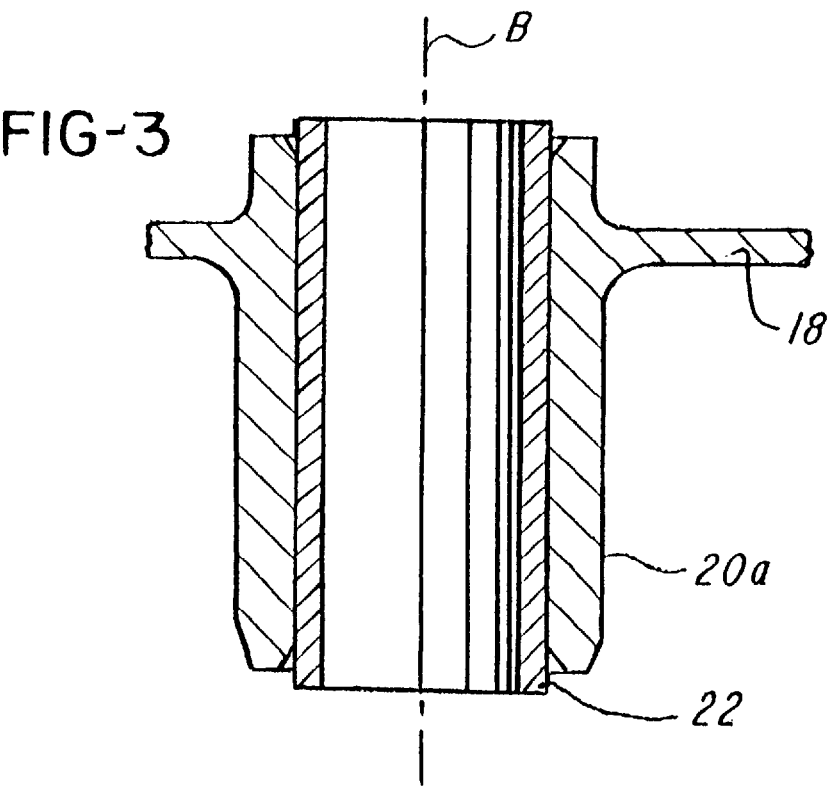
FIG. 3 is a fragmentary sectional view showing a sleeve bearing integrally molded as part of a housing body.
Figure 4:
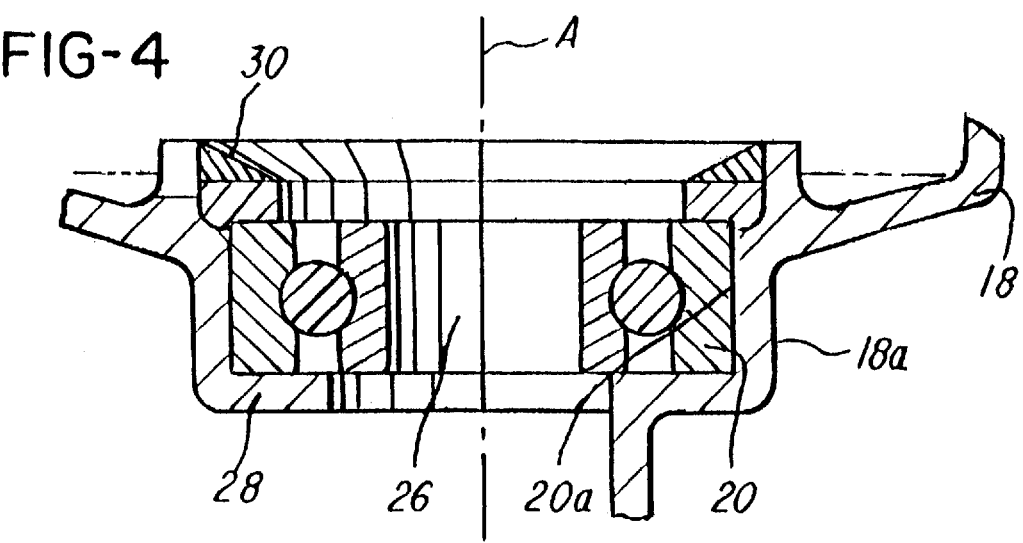
FIG. 4 is a fragmentary sectional view of a roller bearing integrally molded as part of a housing.
Figure 5:
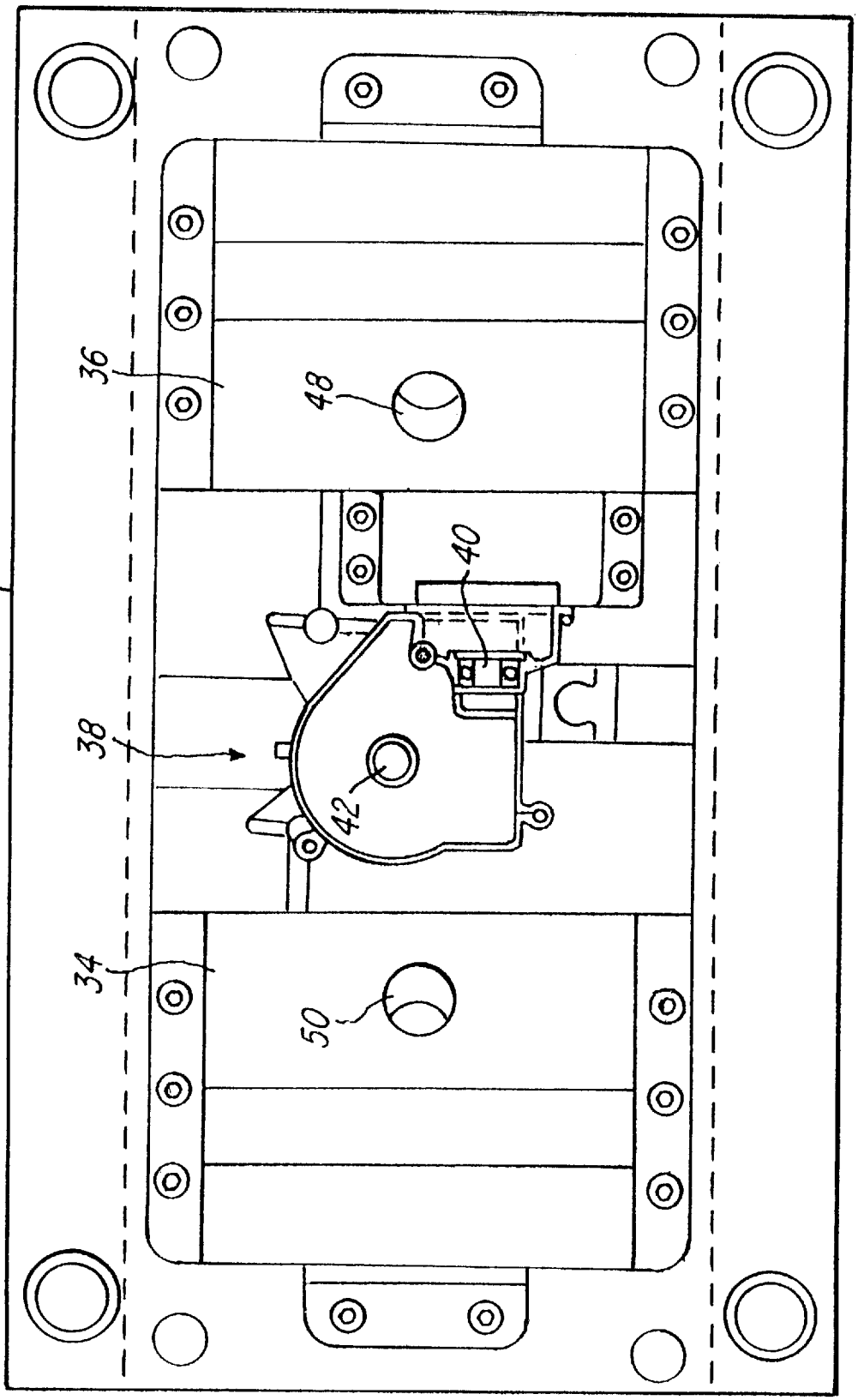
FIG. 5 is a top view of a bottom half of a mold used in an embodiment of this invention.

Referring now to FIGS. 3–4, the sleeve bearing 22 is shown integrally molded into housing 18 (FIG. 3) and roller bearing 20 is shown integrally molded into housing 18 (FIG. 4), respectively. Notice in FIG. 4 that the housing 18 is molded with a bearing support 28 having an aperture 26 for receiving a shaft from motor 24. As described later herein, the housing 18 is insert molded around roller bearing 20 such that it becomes an integral part of motor housing 18. In the embodiment being described, a reinforcement support 30 may also be integrally molded as part of the motor housing 18 in order to provide additional reinforcement for locking and supporting roller bearing 20 in motor housing 18.

Although now shown, the bearings 20 and 22 may be provided with serrations or grooves on their outer surfaces 20a and 22a, respectively, to facilitate ensuring the integral connection between roller bearing 20, for example, and motor housing 18.

Referring now to FIGS. 5–9, mold 14 in accordance with the present invention will now be described.

As illustrated in FIGS. 5–9, mold 14 comprises a bottom die or mold 32 and a top die or mold 44. The bottom mold 32 (FIGS. 5 and 7–9) comprises a first slide 34 and second slide 36 which slide towards and away from a molding station 38 (FIG. 8) where the plurality of parts are integrally molded into motor housing 18. In the embodiment being described, the slides 34 and 36 are resiliently biased away from molding station 38.

Figure 8:
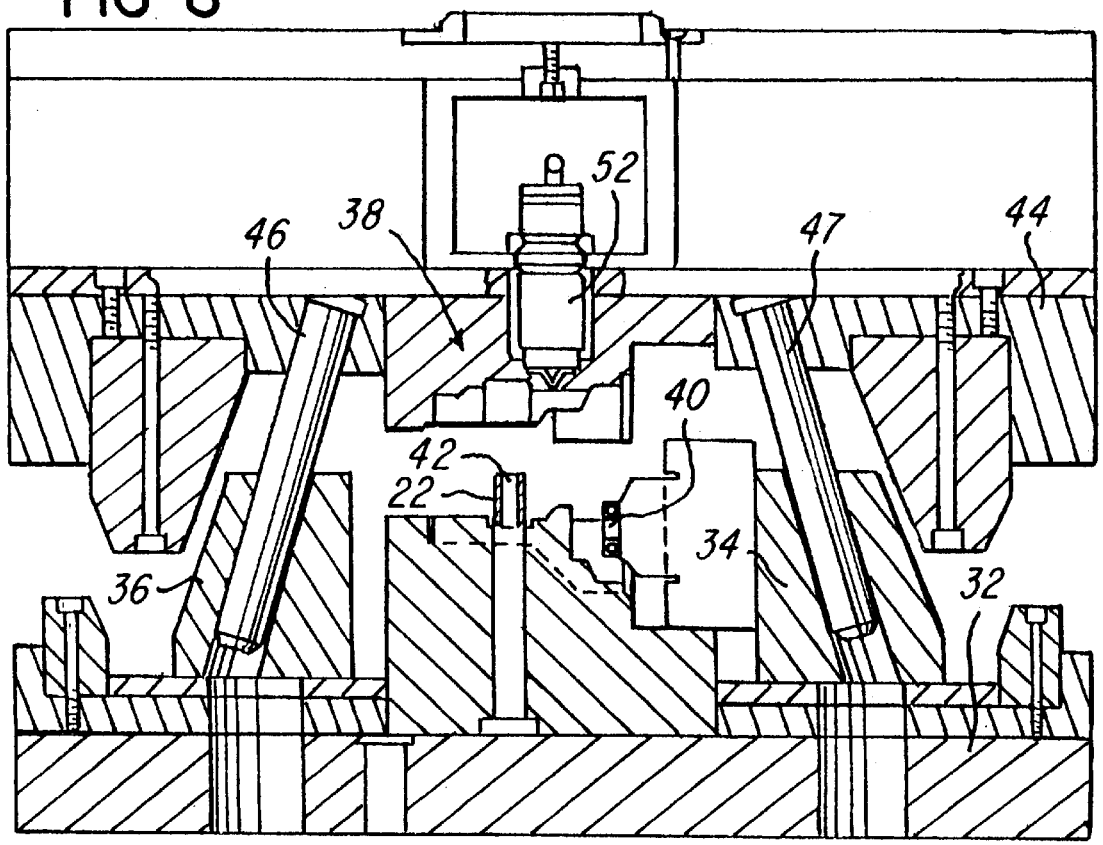
FIG. 8 is a view similar to FIG. 7 wherein the top and bottom molds are shown in a mid-open position.

As illustrated in FIG. 8, for example, the second slide 36 comprises a bearing support 40 for supporting roller bearing 20 on mold 32. The mold 32 also comprises a sleeve support 42 for supporting sleeve bearing 22 at the molding station 38. For illustration, the roller bearing 20 and sleeve bearing 22 are shown mounted on the bearing supports 40 and 42.

Figure 6:
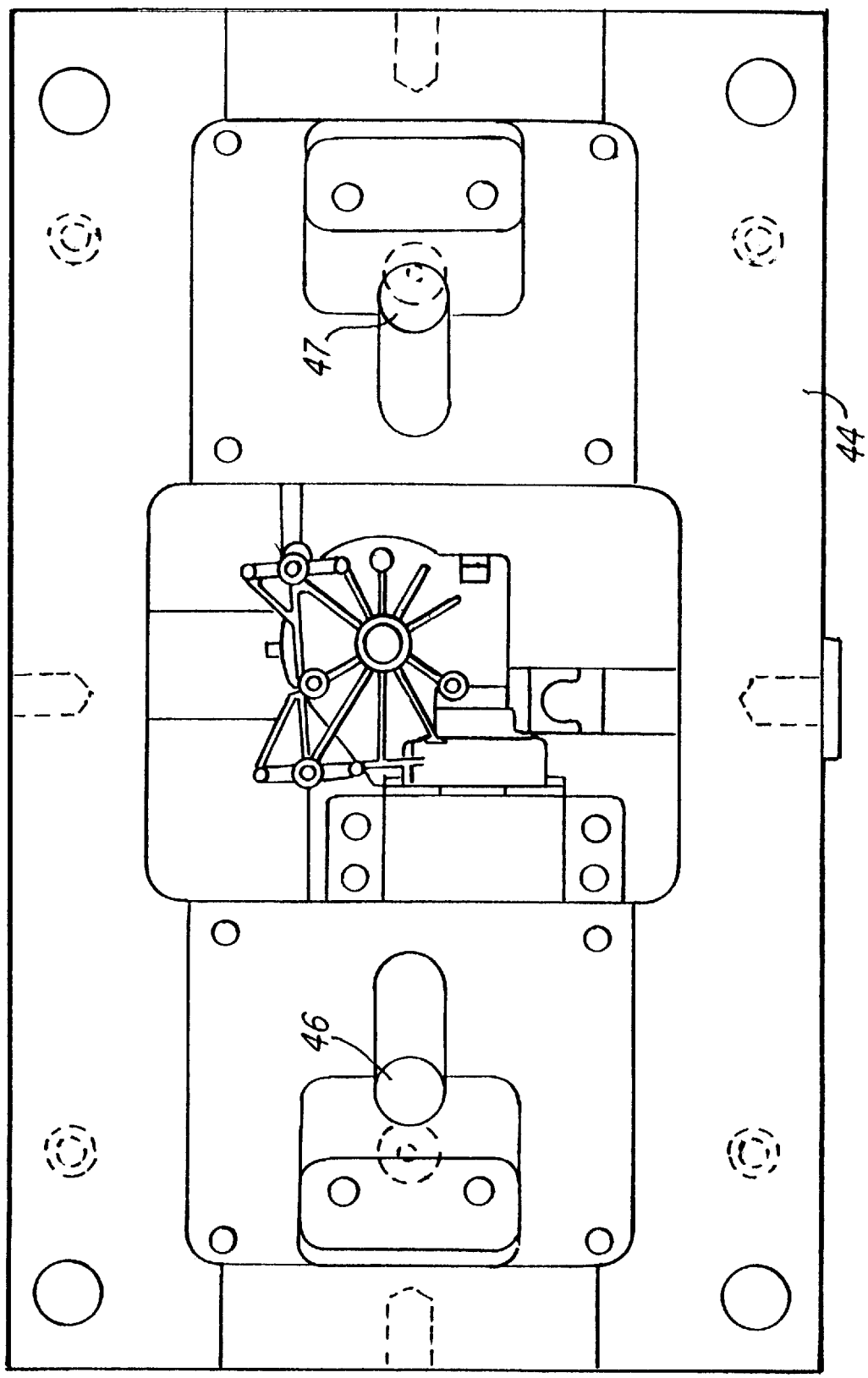
FIG. 6 is a view of a top half of a mold which mates with the mold shown in FIG. 5.
Figure 7:
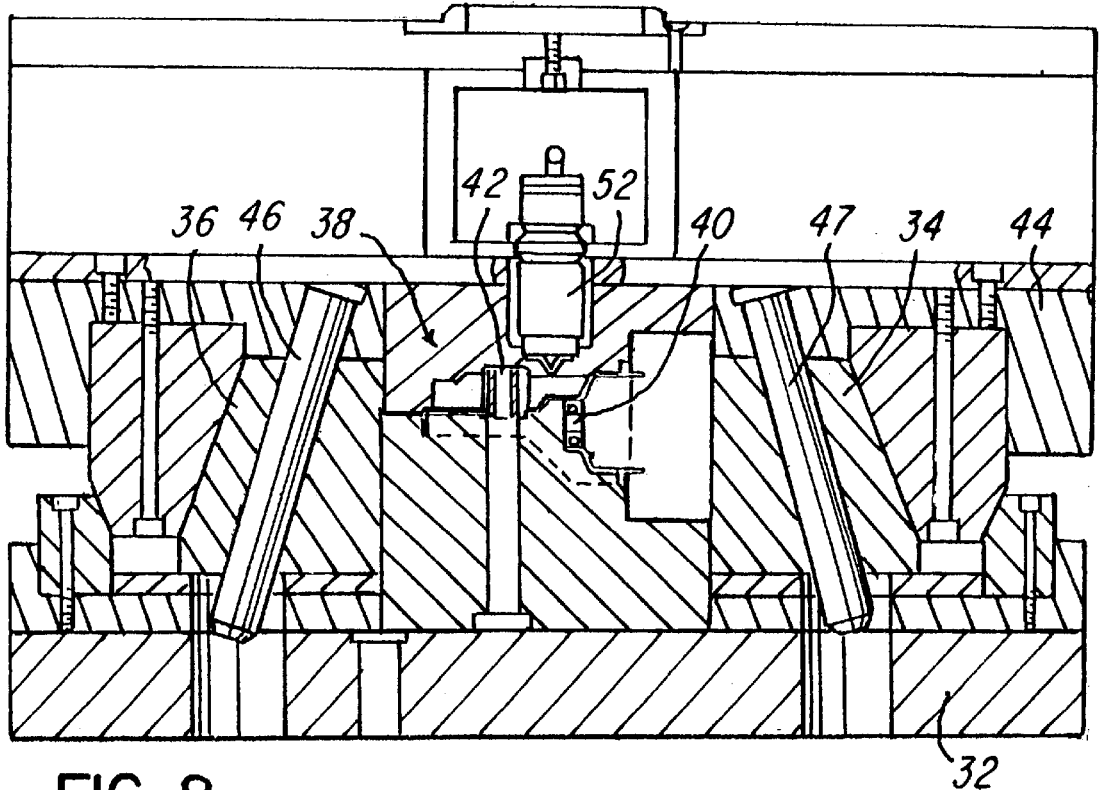
FIG. 7 is a sectional view showing various features of the top mold and bottom mold when the mold is in a closed position.
Figure 9:
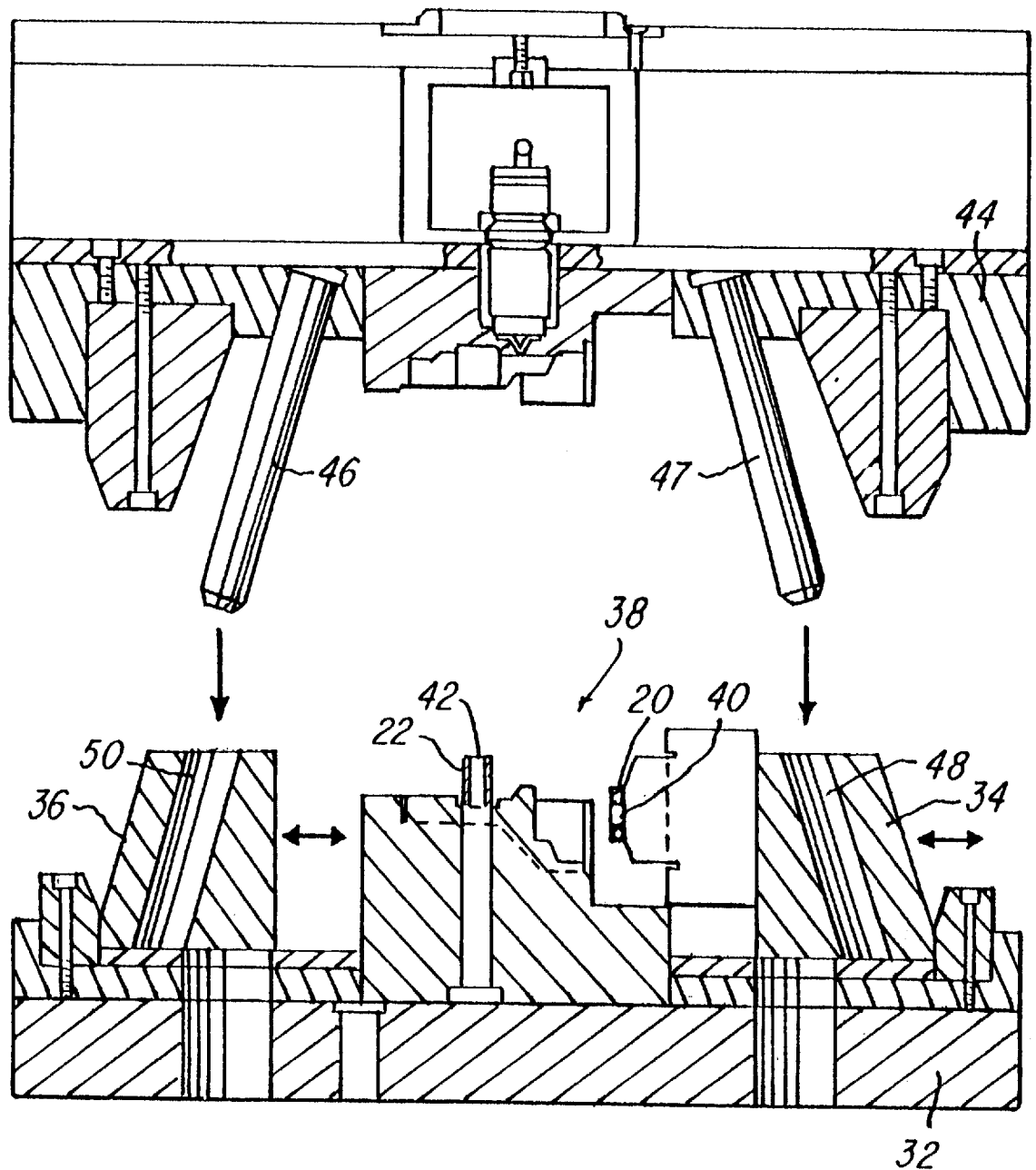
FIG. 9 is a view similar to FIG. 7 wherein the top and bottom molds are shown in a fully open position.

As illustrated in FIG. 6, the molder 10 also comprises a top die or mold 44 which mates with bottom mold 32. The top mold 44 comprises a pair of guide pins 46 and 47 (FIGS. 6 and 7–10) which are received in openings 48 and 50 (FIG. 9), respectively. As best illustrated in FIGS. 7–9, as the top mold 44 is moved towards bottom mold 32 by molding machine 10, the guide pins 46 and 76 are received in openings 48 and 50, respectively. As the molds 32 and 44 are moved closer together, the guide pins 46, 76 cause the slides 34 and 36, respectively, to move towards molding station 38 such that the motor housing 18 can be molded. As described later herein, when the molds 32 and 44 are in the open position, as illustrated in FIG. 10, the operator or a machine can place sleeve bearing 22 on sleeve bearing support 42 and roller bearing 20 on roller bearing support 40. Thereafter, when the molds are in the fully engaged and mating position, as illustrated in FIG. 7, the first slide 44 is moved or driven towards the molding station 38 until the roller bearing 20 is positioned in a desired or predetermined position relative to sleeve bearing 22.

Thereafter, molding machine 10 causes molding material (not shown) to be injected through a gate 52 (FIG. 7) in the manner as is conventionally known. In the embodiment being described, the molding material comprises a fiber-reinforced resin having a heat deflection of about 500° F. at 264 psi. One suitable resin is the resin known as Fortron available from Hoechst Celanese of Chatham, N.J.

After the molding operation is complete, the molds 32 and 44 are separated at which time the guide pins 46 cause slides 34 and 36 to move away from the molding station 38. An operator or machine can then remove the molded housing 18. As mentioned previously herein, a plurality of molds could be provided on the molder 10 such that while a part is being molded, a second part can be removed from the molding machine.

In the embodiment being described, the roller bearing 20 and sleeve bearing 22 are integrally molded into motor housing 18 at temperatures ranging from 300° F. to about 350° F.

It has been found that because of the high temperatures of the molding process in the embodiment being described, it is important to apply a part lubricant which will survive the molding process such that the roller bearing 20 and sleeve bearing 22 will be adequately lubricated when used in operation. The lubricant is applied to the bearings prior to the molding process. In the embodiment being described, one suitable lubricant for ball bearing 20 has been found to be lubricant product No. DPM-3653 available from Standard Oil of California, San Francisco, Calif. A suitable lubricant for sleeve bearing 22 has been found to be product No. DPM-4253 available from Permawick of Bingham Farms, Mich. In the embodiment being described, the lubricant for roller bearing 20 comprises the following properties as shown in Table 1 and the lubricant for sleeve bearing 22 comprises the properties shown in Table 2. Tables I and II are as follows:

TABLE I

| | | |
|---|---|---|
| A. | Viscosity at 38° C. | 600 sec. min. |
| B. | Viscosity at 99° C. | 55 sec. min. |
| C. | Viscosity Index | 83 min. |
| D. | Pour Point | −3° C. max. |
| E. | Flash Point | 188–193° C. |
| F. | Fire Point | 121–129° C. |

TABLE II

| | | |
|---|---|---|
| A. | Viscosity | Kinematic Viscosity |
| | at 100° C. | 7.0–9.5 cst |
| | at 40° C. | 39–46 cst |
| | at −18° C. | 1050–1350 cst |
| | at −40° C. | 12,000–15,500 cst |
| B. | Pour Point | −55° C. |
| C. | Flash Point | 230° C. min. |
| D. | Fire Point | 260° C. min. |
| E. | Viscosity | 170 min. |

A method for manufacturing a motor and motor housing for use in a vehicle will now be described. FIG. 10 shows a general schematic diagram of the method. At block 50, the plastic or resin materials and bearings 20 and 22 are provided to molding machine 10 whereupon the resin material is loaded into molding machine 10. With the molds in the open position (FIG. 9), an operator loads a sleeve bearing 22 (block 52) onto sleeve bearing support 42 and also loads a roller bearing 20 onto roller bearing support 40. The molding machine 10 is actuated (block 54) by a controller (not shown) and the rotary table 12 is then rotatably driven (block 56) to drive the molds 32 and 44 towards the molding station 38 (block 58). As the molds 32 and 44 mate, the bearings 20 and 22 become positioned at the molding station 38. Molding machine 10 then molds (block 60) the motor housing 18 thereby causing the bearings 20 and 22 to become molded in a predetermined position in motor housing 18. Thus, it should be appreciated that the roller bearing support 40 and the sleeve bearing support 42 provide locator or locating means for locating the roller and sleeve bearings 20 and 22, respectively. Notice also that the roller bearing support and sleeve bearing support 40 and 42 are integrally formed or mounted onto mold 32.

After the insert molding process is complete, the rotary table 12 (FIG. 1) is again rotatably driven (block 62) to cause mold halves 32 and 44 to move away from the molding station 38. As this happens, the molds 32 and 44 disengage (block 64) and the part or component becomes accessible so that an operator or a machine can remove the molded part (block 66) from the mold 32.

As described earlier herein, it is to be noted that no subsequent operation of machining or inserting of roller bearing 20 or sleeve bearing 22 needs to be performed since they are integrally molded in position. This reduces or eliminates various operations such as deflashing, machining and/or cleaning prior to inserting a bearing as is usually required in die cast operations of the past. Thus, advantageously, applicant's invention provides a method and apparatus which reduces or eliminates many of the steps heretofore required. Because the mold 32 comprises the bearing supports 40 and 42, the bearings become properly aligned in a predetermined position such that when the motor housing 18 is insert molded, the bearings 20 and 22 become properly aligned in the motor housing 18. This reduces or eliminates any deflashing or machining steps which were necessary in operations of the past in order to position the bearings in a desired position.

Once the motor housing 18 is insert molded in the manner described earlier herein, the motor 24 is assembled into the housing 13 (block 68). It is then determined (block 70) if the last component is molded. If it is, the process is complete, otherwise it proceeds to block 50.

The motor 24 and housing 18 may then be operatively mounted in a vehicle, such as a car or truck to provide a motor, for example, for driving a windshield wiper assembly, window, or other component of a vehicle. In this embodiment, the housing 18 and bearings 20 and 22 weigh on the order of about 0.3 lbs. to 0.4 lbs. Advantageously, this facilitates reducing the overall weight of the housing 13 when compared to cast housings used in the past.

Advantageously, the bearings 20 and 22 become molded in position within a tolerance of ±0.05 mm. This facilitates avoiding the alignment inconsistencies of mounting bearings in a cast housing as was done in the past.

While the method and apparatus herein described constitute preferred embodiments of this invention, it is to be understood that the invention is not limited to this precise method and form of apparatus, and that changes may be made in either without departing from the scope of the invention, which is defined in the appended claims.

For example, while the apparatus and method of this invention may be used for constructing a motor housing or for molding parts, such as bearings, into a component, such as a housing, for use in a vehicle, it should be appreciated that the method and apparatus may be suitable for use for molding other parts into a predetermined position into a component. Also, it should also be appreciated that while the parts shown molded into a predetermined position include the roller bearing 20 and sleeve bearing 22, other suitable parts may be used or insert molded into the motor housing 18.

In the embodiment being described, the bearings are held in a predetermined position such that the axis of the roller bearing 20 lies in the first plane which is substantially perpendicular to the plane in which the axis of sleeve bearing 22 lies. In the embodiment being described, the positions of the roller and sleeve bearings 20 and 22 in housing 18 are maintained a tolerance of plus or minus ±0.05 mm.

What is claimed is:

1. A wiper motor for use in a vehicle comprising:
    a motor housing;
    a plurality of prelubricated bearings integrally molded into a predetermined position in said housing member said plurality of prelubricated bearings comprising a lubricant which can survive the molding process when the housing member is molded; and
    a motor situated in said motor housing and having a plurality of shafts received in said plurality of bearings.

2. The wiper motor as recited in claim 1 wherein at least one of said plurality of prelubricated bearings comprises a sleeve bearing.

3. The wiper motor as recited in claim 2 wherein at least one of said plurality bearings comprises a roller bearing.

4. The wiper motor as recited in claim 1 further comprising:
    a lubricant situated on at least one of said plurality of prelubricated bearings.

5. The wiper motor as recited in claim 1 wherein at least one of said plurality of bearings comprises a roller bearing, said wiper motor further comprising:
    a lubricant for lubricating said roller bearing.

6. The wiper motor as recited in claim 4 wherein said lubricant comprises a lubricating grease having a kinematic viscosity on the order of 7.0–9.5 cst at about 100 degrees centigrade.

7. The wiper motor as recited in claim 1 wherein said plurality of bearings comprises a first bearing and a second bearing, said first and second bearings each comprising an axis, said first and second bearings being integrally formed in said wiper motor such that said axis of said first bearing is not co-axial with said axis of said second bearing.

8. The wiper motor as recited in claim 7 wherein said axis of said first bearing lies in a first plane and said axis of said second bearing lies in a second plane, said first and second bearings being molded such that said first and second planes are substantially perpendicular.

9. The wiper motor as recited in claim 1 wherein said motor housing weighs less than about one pound.

10. The wiper motor as recited in claim 1 wherein said motor housing is a one-piece construction molded from a fiber-reinforced resin having a heat deflection of about 500 degrees fahrenheit at 264 psi.

11. The wiper motor as recited in claim 10 wherein said fiber-reinforced resin comprises a heat deflection of about 500 degrees fahrenheit at 264 psi.

12. The wiper motor as recited in claim 1 wherein said plurality of bearings comprises a slide bearing and a roller bearing.

13. A motor housing comprising:
    a housing member; and
    a plurality of parts integrally molded into a predetermined position in said housing member, said plurality of parts each having a lubricant which can survive a molding process when the plurality of parts are integrally molded in the housing member.

14. The motor housing as recited in claim 13 wherein at least one of said plurality of parts comprises a sleeve bearing.

15. The motor housing as recited in claim 14 wherein at least one of said plurality of parts comprises a roller bearing.

16. The motor housing as recited in claim 13 further comprising:

a lubricant situated on at least one of said plurality of parts.

17. The motor housing as recited in claim 13 wherein at least one of said plurality of parts comprises a bearing, said motor housing further comprising:

lubricating said bearing with a lubricant.

18. The motor housing as recited in claim 16 wherein said lubricant comprises a lubricating grease having a kinematic viscosity on the order of 7.0–9.5 cst at about 100 degrees centigrade.

19. The motor housing as recited in claim 13 wherein said plurality of parts comprises a first part and a second part, said first and second parts each comprising an axis, said first and second parts being integrally formed in said motor housing such that said axis of said first part is not co-axial with said axis of said second part.

20. The motor housing as recited in claim 19 wherein said axis of said first part lies in a first plane and said axis of said second part lies in a second plane, said first and second parts being molded such that said first and second planes are substantially perpendicular.

21. The motor housing as recited in claim 13 wherein said motor housing weighs less than one-half of a pound.

22. The motor housing as recited in claim 13 wherein said motor housing is a one-piece construction molded from a fiber-reinforced resin having a heat deflection of about 500 degrees fahrenheit at 264 psi.

23. The motor housing as recited in claim 21 wherein said fiber-reinforced resin comprises a heat deflection of about 500 degrees fahrenheit at 264 psi.

24. The motor housing as recited in claim 21 wherein said housing member is capable of receiving a windshield wiper motor.

25. The motor housing as recited in claim 21 wherein said plurality of parts comprises a slide bearing and a roller bearing.

* * * * *